(12) United States Patent
Miller et al.

(10) Patent No.: US 9,427,824 B2
(45) Date of Patent: Aug. 30, 2016

(54) LASER PROCESSING SYSTEM AND METHOD OF USE

(75) Inventors: Daniel B. Miller, New Richmond, WI (US); Jeffrey L. Kulibert, Somerset, WI (US); James J. Bucklew, Somerset, WI (US); Thomas P. Gates, New Richmond, WI (US)

(73) Assignee: PRECO, INC., Somerset, WI (US)

( * ) Notice: Subject to any disclaimer, the term of this patent is extended or adjusted under 35 U.S.C. 154(b) by 741 days.

(21) Appl. No.: 13/516,954

(22) PCT Filed: Jun. 15, 2012

(86) PCT No.: PCT/US2012/042619
§ 371 (c)(1),
(2), (4) Date: Jun. 18, 2012

(87) PCT Pub. No.: WO2012/174351
PCT Pub. Date: Dec. 20, 2012

(65) Prior Publication Data
US 2013/0334739 A1 Dec. 19, 2013

Related U.S. Application Data

(60) Provisional application No. 61/497,791, filed on Jun. 16, 2011.

(51) Int. Cl.
*B23K 26/364* (2014.01)
*B23K 26/08* (2014.01)
(Continued)

(52) U.S. Cl.
CPC ........... *B23K 26/0846* (2013.01); *B23K 26/16* (2013.01); *B23K 26/364* (2015.10);
(Continued)

(58) Field of Classification Search
CPC .............. B23K 26/38; B23K 26/0846; B23K 26/0892; B23K 26/365; B23K 26/367; B23K 26/0087; B23K 26/026; B23K 26/409; B23K 2201/16; B23K 26/364; B23K 26/702; B23K 26/16

USPC ......... 264/400, 482, 1.37, 1.6, 169, 39, 154, 264/160, 172.19, 173.1; 156/272.8, 324, 156/391, 495, 494, 496, 507, 510, 509, 508, 156/513
See application file for complete search history.

(56) References Cited

U.S. PATENT DOCUMENTS 7,284,305 B1 * 10/2007 Allen et al. .......................... 26/7
2002/0000164 A1 * 1/2002 Mizutani et al. ............... 101/32
(Continued)

FOREIGN PATENT DOCUMENTS

JP 11047973 A 2/1999
RU 2062232 C1 6/1996
(Continued)

OTHER PUBLICATIONS

International Search Report and Written Opinion; PCT/US2012/042619; Oct. 11, 2012.

*Primary Examiner* — Yogendra Gupta
*Assistant Examiner* — Ninh Le
(74) *Attorney, Agent, or Firm* — Westman, Champlin & Koehler, P.A.; Z. Peter Sawicki; Amanda Prose

(57) ABSTRACT

A laser processing system includes a metal platform having a metal surface wherein at least a portion of the platform surface is substantially planar with a substantially smooth topography. A laser source is configured to generate a laser beam having a focal point that is directed toward a substantially planar portion of the platform surface. A motion mechanism is configured to move at least one of the metal platform and the focal point along at least one axis. A restraining mechanism restrains a film against the platform surface such that an adjoining surface of the restrained film remains in intimate contact with the surface. A controller is configured to operate the laser source, the motion mechanism or both to cut the restrained film in a predetermined pattern with a generated laser beam such that the cut does not extend through the adjoining surface of the restrained film.

15 Claims, 8 Drawing Sheets

(51) Int. Cl.
*B23K 26/16* (2006.01)
*B23K 26/38* (2014.01)
*B23K 26/40* (2014.01)

(52) U.S. Cl.
CPC ............ *B23K 26/38* (2013.01); *B23K 26/40* (2013.01); *B23K 26/702* (2015.10); *B23K 2201/16* (2013.01); *B23K 2203/172* (2015.10)

(56) References Cited

U.S. PATENT DOCUMENTS

2002/0185479 A1* 12/2002 Lawson .................. 219/121.84
2003/0051440 A1* 3/2003 Chow et al. .................... 53/412
2004/0159637 A1* 8/2004 Herke et al. ............. 219/121.18
2008/0031640 A1* 2/2008 Fukui ................ 399/9
2009/0031870 A1 2/2009 O'Connor
2010/0044354 A1 2/2010 Lupinetti

FOREIGN PATENT DOCUMENTS

RU 2151036 C1 6/2000
WO WO 2010021025 A1 * 2/2010 ............ B65H 35/00

* cited by examiner

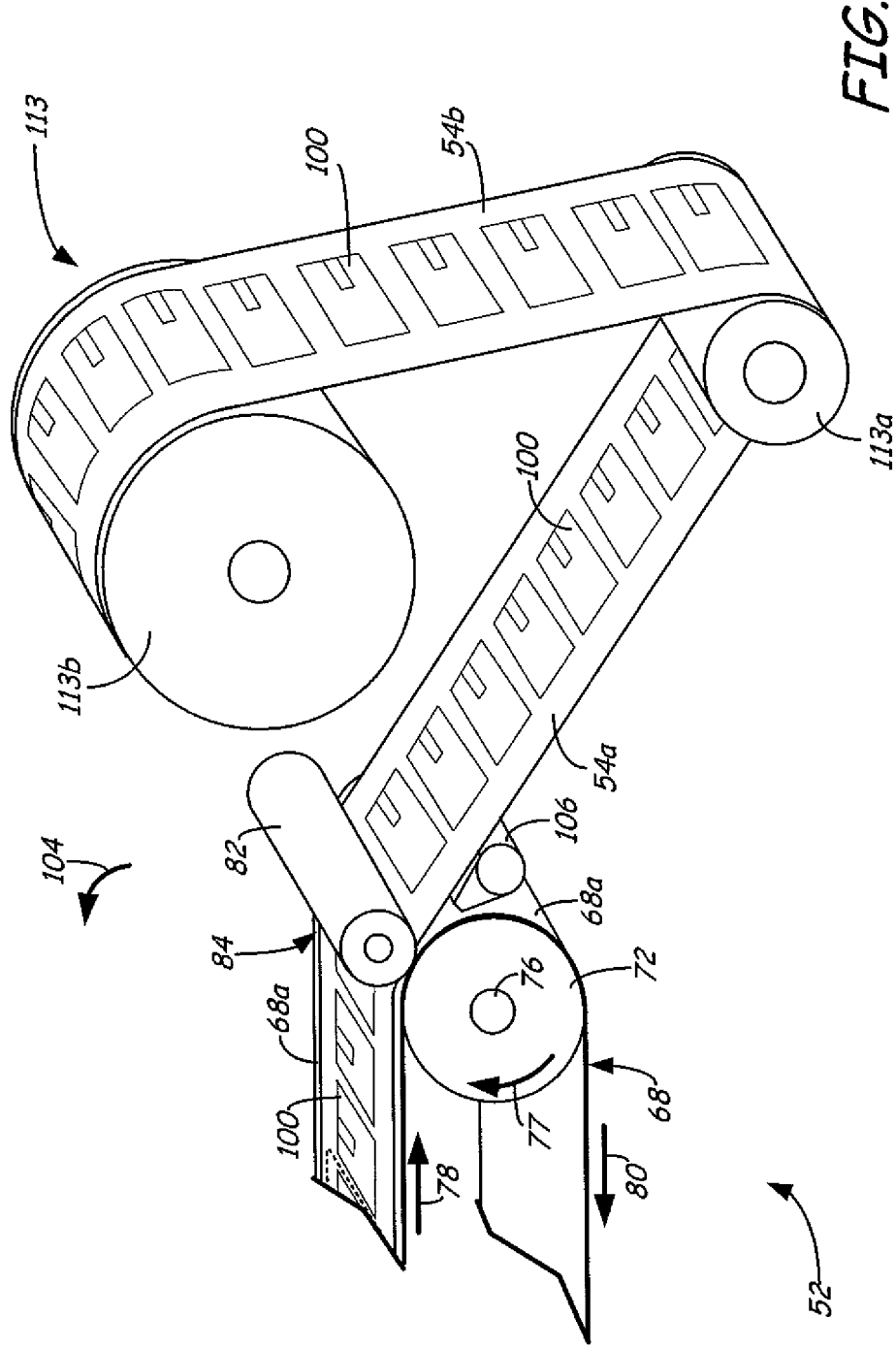

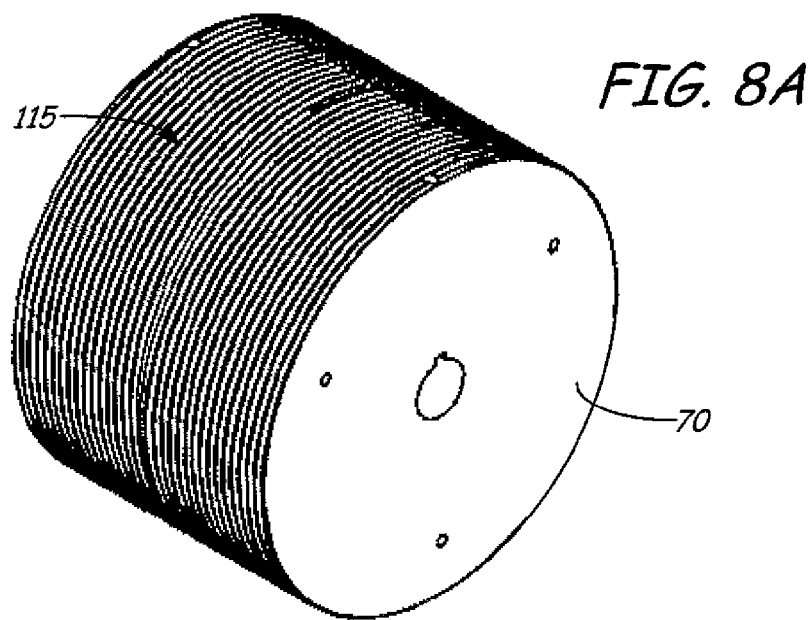
FIG. 8A
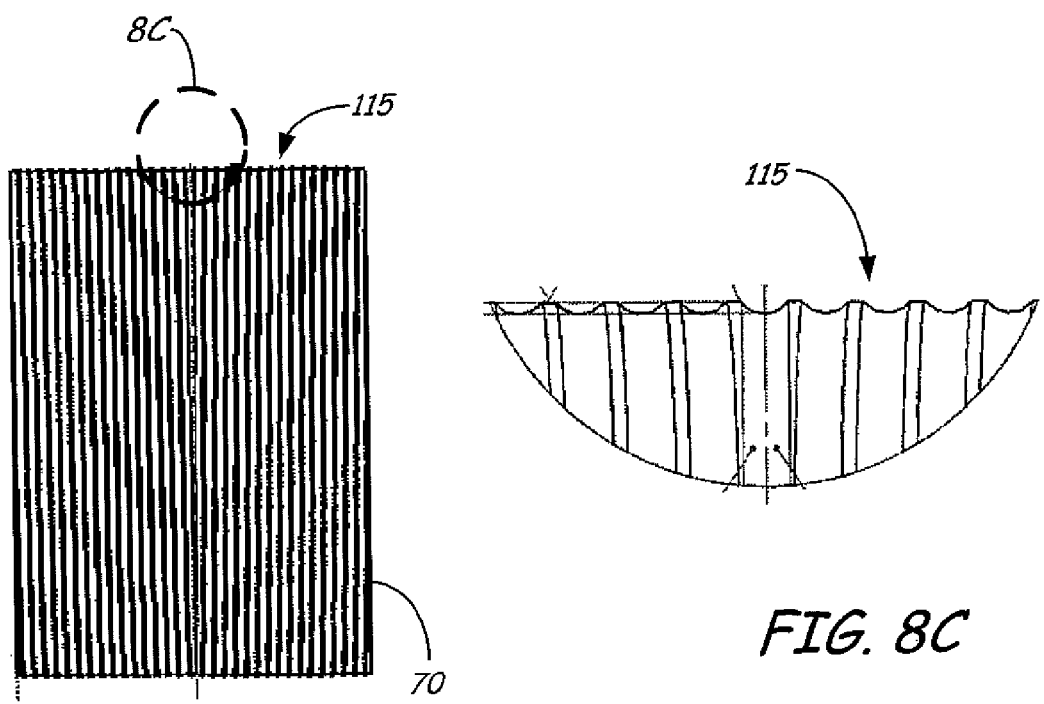
FIG. 8B
FIG. 8C

US 9,427,824 B2

LASER PROCESSING SYSTEM AND METHOD OF USE

CROSS-REFERENCE TO RELATED APPLICATION

This Application is a Section 371 National Stage Application of International Application No. PCT/US2012/042619, filed Jun. 15, 2012, the content of which is hereby incorporated by reference in its entirety.

BACKGROUND OF THE INVENTION

The present disclosure is directed to a system and method for processing films. In particular, the present disclosure is directed to a system and method for laser cutting of films, such as those that require clean cuts.

Laser beams are used in numerous applications, including drilling, machining, and cutting a variety of different films and materials. For example, laser processing of a moving web involves directing a focused beam onto the surface of the web of a film as the web is advanced. As the beam touches the surface of the moving web, the beam vaporizes and/or melts the web material.

Typically, laser processing requires the minimization of flapping and shifting of the web, while advancing the web under the laser beam. Rollers positioned on opposite sides of the laser may hold the web material in tension and advance the web through the cutting zone underneath the laser beam. However, tensioning the web lacks precision, because the physical lamination or chemical structure of the web can vary across the sheet, affecting the elasticity of the sheet material. In other words, the rollers may hold some areas in tension while other areas of the web can flap and flutter as the web is advanced by the rollers particularly at high speeds.

Many types of films, such as electronic or optical films, require precise location and positioning of the laser focal point, as well as accurate laser power modulation. When the web shifts, flaps, or otherwise moves, the precision of the laser focal point placement and the modulation of the power are affected. Specifically, inaccuracy in the cut or placement of the laser focal point may affect the power level at which the laser must be run in order to perform the cutting process.

Additionally, films can become contaminated by the plumes ejected from laser cutting processes. Many conventional laser processing systems use vacuums to draw away generated plumes (e.g., smoke and debris) from the cutting areas. However, particles from the plumes may still potentially contaminate the films, which may reduce the qualities of the resulting cut films.

SUMMARY OF THE INVENTION

This disclosure also includes a laser processing system comprising a metal platform having a platform surface wherein at least a portion of the platform surface is substantially planar with a substantially smooth topography. A laser source is configured to generate a laser beam having a focal point that is directed toward a substantially planar portion of the platform surface. A motion mechanism is configured to move at least one of the metal platforms and the laser source along at least one axis. A restraining mechanism is configured to restrain a film against a platform surface such that an adjoining surface of the restrained film remains in intimate contact with the surface of the metal substrate within the substantially planar portion of the platform surface. A controller is configured to operate the laser source, the motion mechanism, or both to cut the restrained film in a predetermined pattern with a generated laser beam such that the cut may or may not extend to the adjoining surface of restrained film.

This disclosure also includes a method for laser processing of film with a method comprising rotating a metal belt having a belt surface with a substantially smooth topography and biasing a roller toward the belt surface of the metal belt. A film is fed pressing the film against the belt surface such that an adjoining surface of the film is in intimate contact with the belt surface. The biased roller is moved apart from the belt surface based on a rotation of the roller to disengage the roller from the fed film. The biased roller is re-engaged with the fed film to press the fed film against the belt surface. A laser beam is generated, the laser beam having a focal point that is directed towards the pressed film and the focal point is moved relative to the pressed film to cut into the pressed film based on a predetermined pattern. The laser beam is discontinued and after discontinuance the adjoining surface of the pressed film remains uncut.

The present invention farther includes a method for laser processing of film with the method comprising rotating a metal belt having a belt surface with a substantially smooth topography. Film is fed pressing the film against a belt surface such that an adjoining surface of the film remains in intimate contact with the belt surface. A channel is cut into the pressed film with a laser beam wherein an adjoining surface of the cut film remains in intimate contact with the belt surface at the cut channel. Cut film is removed from the belt surface wherein the residue of the cut film remains on the belt surface at a location of the cut channel and at least a portion of the residue is removed from the belt surface while rotating the metal belt.

BRIEF DESCRIPTION OF THE DRAWINGS

FIGS. 5A and 5B are perspective illustrations of a web-based, laser processing system of the present disclosure in use.

FIG. 8A is a perspective illustration of a roller of the web-based, laser processing system, illustrating pitched grooves of the roller.

FIG. 8B is a front illustration of the roller having the pitched grooves.

FIG. 8C is an expanded illustration of Section 8C taken in FIG. 8B.

DETAILED DESCRIPTION

The present disclosure is directed to a laser processing system and technique for cutting films with high-positional accuracies and little or no film contamination to provide clean cuts. The system includes a metal substrate having a surface with a substantially smooth topography, which is configured to receive a film for a laser cutting process. The system also includes a laser source configured to direct a laser beam toward the received film to cut the film in a predetermined pattern, where the cut does not extend entirely through the film, or barely cuts through the film with the tip of the laser beam. This control of the laser beam directs the resulting plume (e.g., smoke and debris) upwards and away from the underlying metal substrate surface. As discussed below, this provides cuts with high-positional accuracies and little or no film contamination, making the system particularly suitable for cutting multi-layered laminated films.

Figure 1:
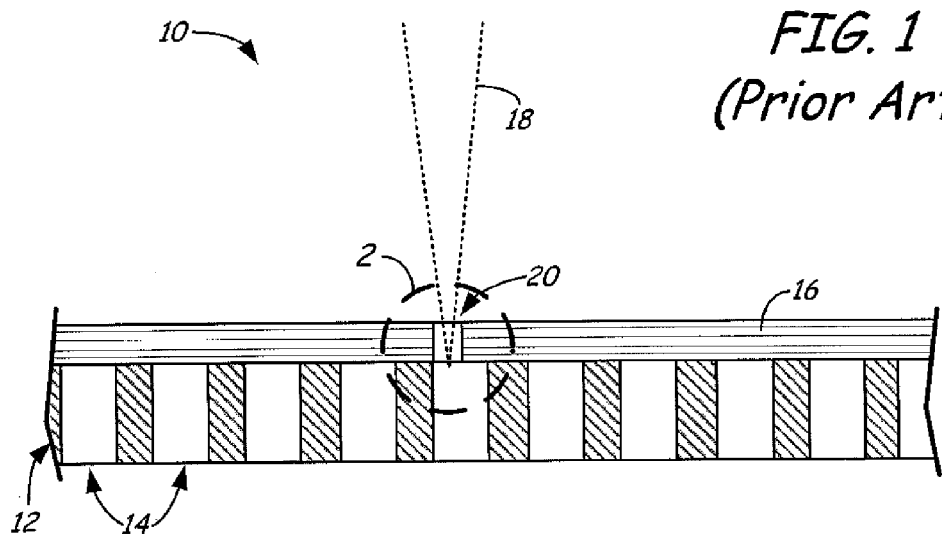
FIG. 1 is a schematic illustration of a conventional laser processing system in use.
Figure 2:
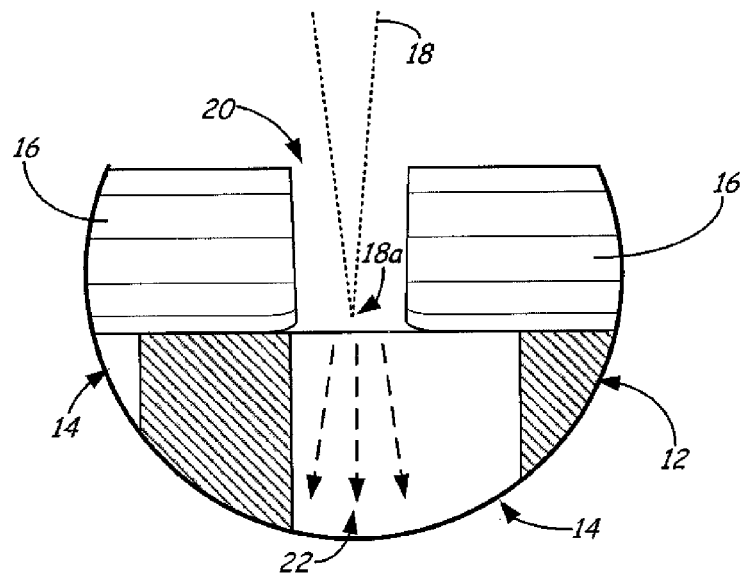
FIG. 2 is an expanded view of Section 2 taken in FIG. 1.

Conventional laser cutting systems for cutting films either stretch a film under tension (e.g., between rollers), or, as depicted by system 10 in FIG. 1, incorporate screens or mesh backings, such as mesh backing such as honeycomb support 12 having numerous holes 14. As shown, a film, such as film 16, is supported on top of honeycomb support 12 to undergo the laser cutting process. A laser source (not shown) then emits laser beam 18 toward film 16 to cut kerf or channel 20 through the entire thickness of film 16. In particular, as shown in FIG. 2, laser beam 18 has a focal point 18a selected to cut entirely through film 16 and eject a plume of smoke and debris (referred to as plume 22) substantially downward through holes 14. Cutting film 16 in this manner allows the smoke and debris from plume 22 to be directed away from film 16, in an attempt to reduce the contamination of film 16. As mentioned above, contamination of clean films is undesirable as the contamination may reduce their functional properties.

However, cutting entirely through film 16 in this manner increases wear on honeycomb support 12 due to the exposure to laser beam 18 and plume 22. Over successive cutting operations, the exposure may begin to damage honeycomb support 12, requiring replacement. Additionally, ejecting plume 22 downward generates horizontal vibrations in film 16, which can delaminate the bottom layers of film 16 from each other at channel 20. The interstitial regions created by the delaminating layers are prone to receiving portions of the smoke and debris of plume 22, thereby contaminating film 16.

Moreover, the horizontal vibrations and the force of plume 22 may also cause film 16 to lift upward from honeycomb support 12, as illustrated in FIG. 2. This lifting also allows the smoke and debris of plume 22 to be collected on the bottom surface of film 16, and may shift the location of film 16 relative to focal point 18a. In other words, the lifting may defocus laser beam 18 from its intended focal location, thereby affecting the laser power at the cut location, which can reduce the cutting accuracy. Each of these factors may contribute to film 16 being cut with lower-positional accuracies and induce film contamination, potentially rendering film 16 unusable in many applications.

Figure 3:
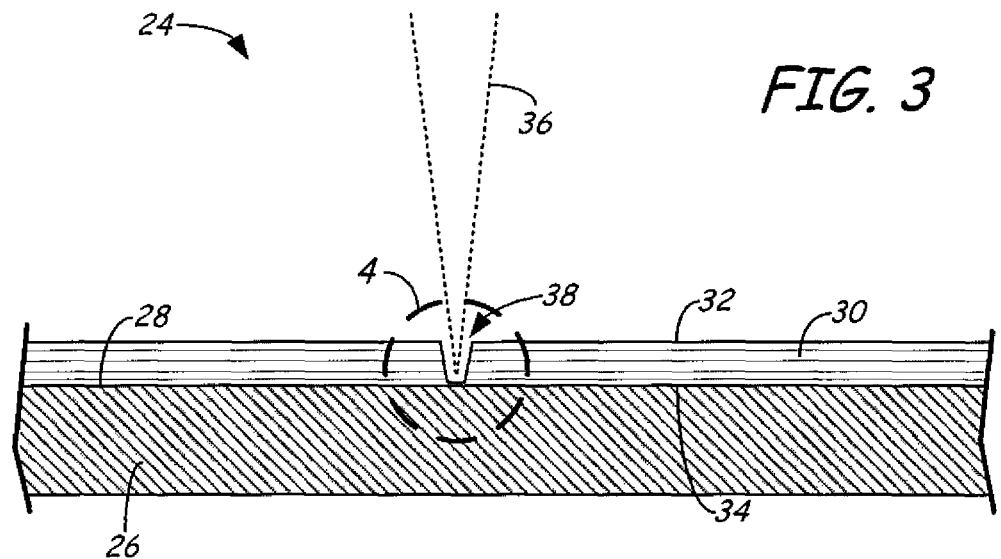
FIG. 3 is a schematic illustration of a laser processing system of the present disclosure in use.

As shown in FIG. 3, laser processing system 24 of the present disclosure, however, is configured to cut films (e.g., multi-layered optical films) with high-positional accuracies and little or no film contamination to provide clean cuts. For example, system 24 may cut precise channels in films with tight tolerances, such as accuracies ranging from about 50 micrometers (about 2 mils) to about 100 micrometers (about 4 mils).

In the shown embodiment, system 24 includes metal substrate 26 derived from one or more metal materials, such as stainless steel, aluminum, nickel, and the like. Metal substrate 26 includes substrate surface 28, where substrate surface 28 has a substantially smooth topography and is desirably substantially planar. The substrate surface is a continuously solid surface that is, the substrate surface has no holes, openings, apertures of significant size, and the like. Therefore, there is intimate contact between the bottom surface of the film 16 and the substrate surface 28 through at least the cut zone or work area in which the focal point of the laser beam operates. Substrate surface 28 is suitable for receiving film 30 having top surface 32 and bottom surface 34. In embodiments in which film 30 is a multi-layered film, top surface 32 is the top exposed surface of the top-most layer, and bottom surface 34 is the bottom exposed surface of the bottom-most layer.

As shown, bottom surface 34 of film 30 is an adjoining surface to substrate surface 28, where bottom surface 34 is desirably maintained in intimate contact with continuously solid substrate surface 28 during the laser cutting process. This intimate contact is attained by the substantially smooth and continuously solid topography of substrate surface 28, along with placing film 30 under tension and/or pressure against metal substrate 26, as discussed below. By intimate contact is meant that the bottom surface of the film is in continuous relationship with the solid substrate surface throughout the area being cut by the laser beam.

The terms "about" and "substantially" are used herein with respect to measurable values and ranges due to expected variations known to those skilled in the art (e.g., limitations and variabilities in measurements). For example, the substantially smooth topography of substrate surface 28 may include small orifices (not shown) for drawing a vacuum to assist in maintaining the intimate contact, where the cross-sectional dimensions of the small orifices are within design tolerances that do not substantially affect the laser cutting process or edge defects. Examples of suitable diameters for the small orifices range from about 380 micrometers (about 15 mils) or less to about 760 micrometers (30 mils) or less. In comparison, holes 14 of honeycomb support 12 (shown in FIGS. 1 and 2) typically have diameters on the order of about 10 millimeters (about 0.4 inches) or larger. As mentioned above, the larger dimensions of holes 14 may undesirably result in laser beam 18 (shown in FIGS. 1 and 2) defocusing in the film or undercut putting debris on the bottom surface.

The substantially smooth topography of substrate surface 28 also allows film 30 to be cut in virtually an unlimited number of patterns. As such, system 24 is suitable for digital freeform fabrication applications, where system 24 may be operated under computer control to cut film 30 in one or more predetermined patterns based on one or more digital models.

Figure 4:
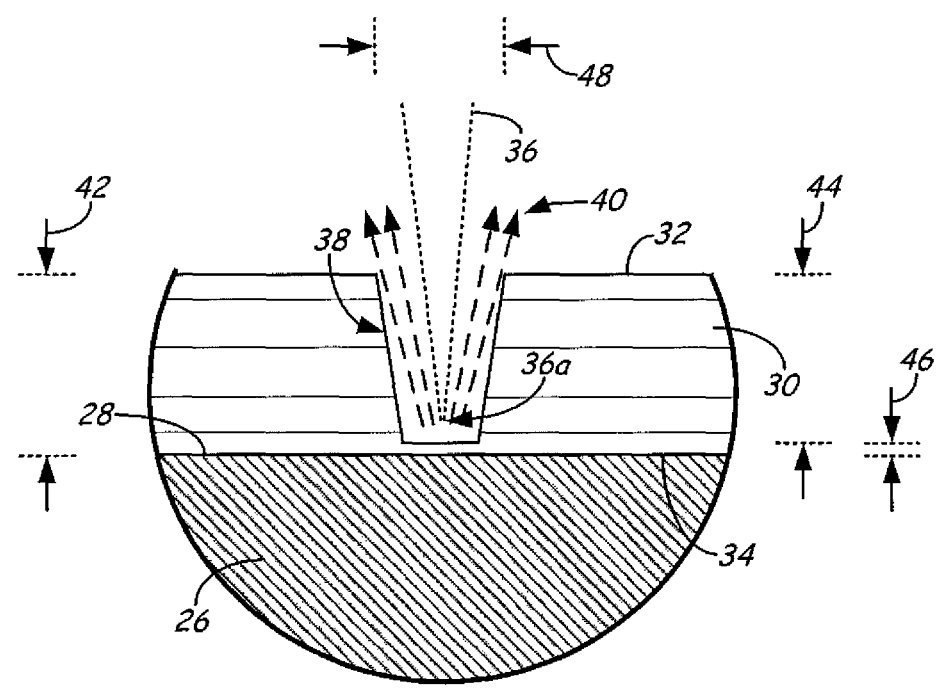
FIG. 4 is an expanded view of Section 4 taken in FIG. 3.

During operation, a laser source of system 24 (not shown) generates laser beam 36 toward film 30 to cut kerf or channel 38 into film 30, downward from top surface 32. As shown in FIG. 4, laser beam 36 has a focal point 36a, and is powered in a manner such that channel 38 does not extend through bottom surface 34 (i.e., channel 38 does not extend entirely through film 54), or barely extends through bottom surface 34. As such, bottom surface 34 remains in intimate contact with substrate surface 28 at channel 38, which provides several advantages.

First, cutting film 30 in this manner ejects a plume of smoke and debris (referred to as plume 40) upward through channel 38, where substantially all of plume 40 is ejected upward (rather than downward through bottom surface 34). In particular, plume 40 may be ejected upward at an angle relative to the incident angle of laser beam 36, thereby ejecting plume 40 upward behind laser beam 36 as laser beam 36 is moved to cut successive portions of channel 38. The plume is ejected upwardly away from the cut in the film. Ejecting plume 40 upward in this manner reduces or eliminates the horizontal vibrations that are otherwise associated with ejecting a plume downward through a film (e.g., plume 22, shown in FIG. 2). This accordingly reduces or prevents the layers of film 30 from delaminating, which prevents the smoke and debris of plume 40 from contaminating the layers of film 30.

Additionally, the upward ejection of plume 40 prevents film 30 from being lifted upward from substrate surface 28. As such, the relative locations of film 30 and focal point 36a are substantially unchanged, thereby preventing laser beam 36 from defocusing. As a result, channel 38 may be cut accurately to provide sharp cut edges. These factors allow system 24 to cut film 30 with high-positional accuracies and little or no film contamination, rendering system 24 suitable for cutting films for use in a variety of applications without the use of a liner thereby substantially reducing the cost of product.

Furthermore, because channel 38 does not extend entirely through film 30 or barely cuts through film 30, metal substrate 26 has a lower exposure to laser beam 36 compared to honeycomb support 12 (shown in FIGS. 1 and 2). Thus, metal substrate 26 may be used for greater durations before requiring replacement.

System 24 may process films (e.g., film 30) derived from a variety of different materials, and having a variety of different dimensions. System 24 is particularly suitable for cutting multi-layered films derived from one or more polymeric materials. The thickness of film 30 (referred to as film thickness 42) for use with system 24 may vary depending on the power settings, speeds, and angles of incidence of laser beam 36. Examples of suitable thicknesses for film thickness 42 range from about 75 micrometers (about 3 mils) to about 1,300 micrometers (about 50 mils), with particularly suitable thicknesses ranging from about 200 micrometers (about 8 mils) to about 760 micrometers (about 30 mils).

During a cutting process, laser beam 36 may be moved across film 30 based on a predetermined pattern to cut the channels, such as channel 38, into film 30. The dimensions of the cut channels (e.g., channel 38) typically exhibit tapered sloped walls that narrow from top surface 32 downward to the bottom of channel 38. Suitable cut depths into film 30 (referred to as cut depth 44) may vary depending on film thickness 42. However, as discussed above, laser beam 36 does not cut entirely through film thickness 42, such that bottom surface 34 of film 30 remains in intimate contact with substrate surface 28 at channel 38. In the case of laser beam 36 barely cutting through film thickness 42, substrate surface 28 is substantially reflective to the residual laser beam 36, and bottom surface 34 remains in intimate contact with substrate surface 28. This forces plume 40 to eject upward and prevents plume 40 from contaminating the bottom layer of film 30.

Another way to describing the depth of the cut especially in a multi-layered film is that the film is cut up to the last (bottom) layer. In other words the bottom layer is left in intimate with substrate surface 28. Another way of describing the cut is that the bottom thickness left is less than or barely equal to the width of the kerf proximate the bottom of the laser cut.

The lateral dimensions of the cut channels (e.g., channel 38) may vary depending on the dimensions and power settings of laser beam 36. Examples of suitable lateral dimensions of channel 38 at top surface 32 (referred to as top width 48) range from about 130 micrometers (about 5 mils) to about 250 micrometers (about 10 mils). Correspondingly, examples of suitable lateral dimensions of channel 38 at the bottom of channel 38 (referred to as bottom width 50) range from about 50 micrometers (about 2 mils) to about 100 micrometers (about 4 mils). Cutting channel 38 in this manner allows system 24 to cut film 30 at a high rate of speed while maintaining high-positional accuracies. This cutting process also allows the intended product to be readily separated from the border portions of film 30 with little effort.

Figure 5A:
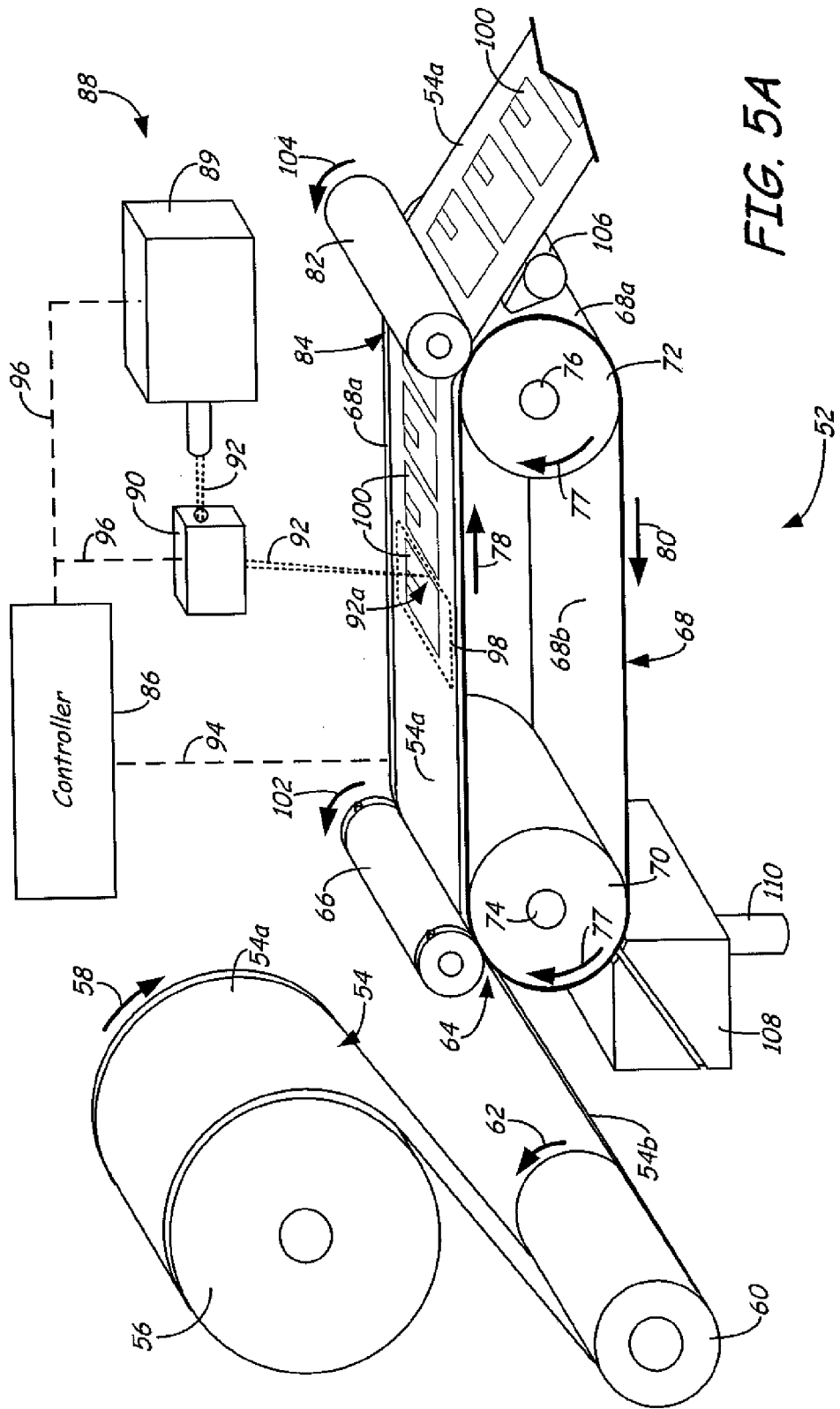

System 24 may be operated in a continuous or sheet operation, based on the design of metal substrate 26. For example, as shown in FIG. 5, laser processing system 52 is an example of an incremental or continuous, web-based system that operates in the same manner as system 24 for cutting a variety of different designs into films, such as film 54, with high-positional accuracies and little or no film contamination. Film 54 is a film corresponding to film 30, and includes top surface 54a and bottom surface 54b.

Film 54 may be supplied to system 52 with spool 56, which is mountable to an axis mount of system 52 (not shown). Successive portions of film 54 may be unwound from spool 56, which rotates spool 56 in the direction of arrow 58. The unwound portions are then wrapped around idler roller 60, which rotates in the direction of arrow 62, and fed to inlet nip 64 formed between nip roller 66 and metal belt 68.

Metal belt 68 is an example of a suitable metal substrate corresponding to metal substrate 26 (shown in FIGS. 3 and 4). Metal belt 68 is derived from one or more metal materials (e.g., stainless steel, aluminum, nickel, and the like), and includes belt surface 68a having a substantially smooth topography, and rear surface 68b. Metal belt 68 is wrapped around rollers 70 and 72 under tension, where rollers 70 and 72 rotate around shafts 74 and 76, respectively. One or both of shafts 74 and 76 may be coupled to a drive motor (not shown) to function as a drive shaft to incrementally or continuously rotate roller 70 and/or roller 72 in the directions of arrows 77. This rotates metal belt 68 in the directions of arrows 78 and 80 around rollers 70 and 72. For example, shaft 76 may be axially connected to a motor (e.g., a servo motor) and shaft 74 may function as a idler shaft to maintain tension on metal belt 68.

At inlet nip 64, film 54 is pressed against metal belt 68 such that bottom surface 54b becomes an adjoining surface in intimate contact with belt surface 68a of metal belt 68. The rotation of metal belt 68 pulls film 54 in the direction of arrow 78 towards nip roller 82, where film 54 is again pressed against metal belt 68 at outlet nip 84. Pressing film 54 against metal belt 68 at inlet nip 64 and outlet nip 84 maintains the intimate contact between bottom surface 54b of film 54 and belt surface 68a of metal belt 68 during the laser cutting process. Furthermore, the portion of metal belt 86 located between rollers 70 and 72 is substantially planar, thereby providing a substantially planar metal substrate for film 54 during the laser cutting process. In alternative embodiments, system 52 may include appropriate magnetic fixture (not shown) underneath metal belt 68 to ensure a substantially planar belt surface 68a for film 54.

In some embodiments, system 52 may also include a vacuum system (not shown) configured to draw a vacuum through metal belt 68 to assist in maintaining the intimate contact between bottom surface 54b of film 54 and belt surface 68a of metal belt 68. For example, system 52 may preferably include a vacuum box (not shown) configured to draw a vacuum through metal belt 68. In this embodiment, metal belt 68 may include small orifices (not shown) that extend through belt surface 68a to draw film 54 against metal belt 68. The cross-sectional dimensions of the small orifices are desirably within design tolerances that do not substantially affect the laser cutting process. As such, belt surface 68a retains a substantially smooth topography even with the small orifices. In alternative embodiments, system 52 may include a static generator (not shown) configured to statically assist maintaining the intimate contact between bottom surface 54b of film 54 and belt surface 68a of metal belt 68. For example, one or both of nip rollers 66 and 82 may be electrically conductive to assist in applying or removing static electricity to or from film 54.

System 54 also includes controller 86 and laser source 87, where laser source 88 includes laser generator 89 and galvo scanner 90. Laser source 88 is configured to generate and direct laser beam 92 toward top surface 54a of film 54 based on commands from controller 86. Controller 86 is one or more computer-based controllers (e.g., a programmable logic controller) configured to operate the components of system 54 using one or more process control loops.

For example, controller 86 may direct the operation of the drive motor to rotate one or both of drive shafts 74 and 76 (and metal belt 68), and may monitor the rotation with one or more rotary encoders (not shown). The communication may be performed over communication line 94, which is one or more electrical and/or wireless communication lines that connect controller 86 to the drive motor and/or the rotary encoder.

Controller 86 may also direct the operation of laser source 88 over communication line 96, which is one or more electrical and/or wireless communication lines that connect controller 86, laser generator 89, and galvo scanner 90. Suitable power-control techniques for operating laser source 88 with control 86 include those disclosed in U.S. Pat. No. 6,177,648.

Laser generator 89 is configured to generate laser beam 92, and direct laser beam 92 to galvo scanner 90, based on commands from controller 86. Suitable devices for laser generator 89 include devices configured to generate $CO_2$ lasers, ND:YAG lasers, and the like. Galvo scanner 90 is configured to direct and move the focal point of laser beam 92 (referred to as focal point 92a) around in a plane above metal belt 68 to cut channels into film 54, in the same manner as discussed above for system 24 (shown in FIGS. 3 and 4).

The range of motion of focal point 92a in the plane above metal belt 68 is generally dictated by the operating capabilities galvo scanner 90. This range of motion defines cut zone 98 for laser beam 92 to cut successive articles from film 54, such as articles 100. While illustrated in use with galvo scanner 90, in alternative embodiments, laser generator 89 may operate with different mechanisms to move focal point 92a around in a given cut zone 98 to cut channels into film 54.

During operation, film 54 may be manually fed from spool 56, around idler roller 60, and to inlet nip 64 to be pressed into intimate contact with metal belt 68. Controller 86 may then communicate with the drive motor and rotary encoder(s) over communication line 94 to rotate rollers 70 and 72, either incrementally or continuously. This rotates metal belt 68 in the directions of arrows 78 and 80, either incrementally or continuously.

The movement of metal belt 68 pulls film 54 in the direction of arrow 78 to outlet nip 84, which places film 54 under tension between inlet nip 64 and outlet nip 84. As mentioned above, this maintains the intimate contact between bottom surface 54b of film 54 and belt surface 68a of metal belt 68. The pulling of film 54 in the direction of arrow 78 also rotates nip rollers 66 and 82 in the directions of arrows 102 and 104, respectively.

Controller 86 may also direct laser source 88 to direct laser beam 92 toward top surface 54a of film 54 to cut channels into film 54 based on a predetermined pattern. The substantially smooth topography of belt surface 68a also allows film 54 to be cut in virtually an unlimited number of patterns. As such, system 52 is also suitable for digital freeform fabrication applications, where controller 86 may direct laser source 88 to cut film 54 in one or more predetermined patterns (e.g., to create articles 100) based on one or more digital models.

As mentioned above, focal point 92a is powered in a manner such that the cut channels do not extend through film 54, or only extends barely through film 54. This may be determined by modulating the power setting of laser source 88 based on the thickness of film 54, the line speed of metal belt 68, the movement speed of laser beam 92, the relative distance between film 54 and laser source 88, and the like.

Because the cut channels do not extend through film 54 or only barely through film 54, bottom surface 54b of film 54 remains in intimate contact with belt surface 68a at the cut channels. This ejects plumes of smoke and debris upward through the cut channels, which reduces or prevents the layers of film 54 from delaminating to reduce or eliminate contamination of the layers of film 54. Additionally, the upward ejection of the plumes prevent film 54 from being lifted upward from belt surface 68a. As such, the relative locations of film 54 and focal point 92a are substantially unchanged, thereby preventing laser beam 92 from defocusing.

Furthermore, because the cut channels do not extend entirely through film 54 or only barely through film 54, metal belt 68 has a lower exposure to laser beam 92 compared to a mesh backing (e.g., honeycomb support 12, shown in FIGS. 1 and 2). Thus, metal belt 68 may be used for greater durations before requiring replacement.

While laser beam 92 desirably does not cut entirely through film 54 or barely cut through film 54 to create articles 100 (to provide precise cuts and little or no film contamination for articles 100), controller 86 may direct laser source 88 to cut entirely through film 54 at locations within cut zone 98 that do not affect articles 100. For example, laser beam 92 may be used to separate film 54 into separate segments by cutting through film 54 between adjacent articles 100 and/or at the lateral borders of film 54. This increases the versatility of system 52 without compromising the quality of articles 100.

After a given article 100 is cut into film 54, controller 86 directs laser generator 89 to stop generating laser beam 92, and directs metal belt 68 to rotate in the directions of arrows 78 and 80 by a single increment (e.g., by an increment with dimensions of cut zone 98), or continuously. Controller 86 may then direct laser source 88 to cut the next article 100 into film 54, and this process may be repeated along successive portions of film 54 to create multiple articles 100 (or other article designs).

Upon exiting outlet nip 84, the cut film 54 is separated from metal belt 68 and may be wound up on a take-up spool (as discussed below), dropped into a collection bin (not shown), or undergo one or more additional post-cutting processes. In the shown embodiment, system 54 also includes air knife 106 to assist in separating film 54 from metal belt 68 after film 54 exits outlet nip 84. While illustrated with a single air knife 106, system 52 may also include additional air knives above and/or below film 54 to assist in the separation from metal belt 68. Additionally, system 52 may also include an anti-static bar (not shown) to remove any static electricity on film 54.

After the separation, metal belt 68 continues to rotate in the directions of arrows 78 and 80 to provide continued intimate contact with successive portions of film 54. Suitable lines speeds for metal belt 68 to pull film 54 range from about 15 meters/minute (about 50 feet/minute) to about 30 meters/minute (about 100 feet/minute), which may be limited based on the operating speeds of laser source 88 and cut pattern complexities.

Due to the small channel floor thicknesses of film 54 at the cut channels (e.g., channel floor thickness 46, shown in FIG. 4), the resulting articles 100 may be readily removed from the borders of film 54 for subsequent use. The cut locations are made with high-positional accuracies to provide articles 100 with accurate dimensions and precise cuts. As such, system 52 may cut precise channels in film 54 with tight tolerances, such as accuracies ranging from about 50 micrometers (about 2 mils) to about 100 micrometers (about 4 mils). Moreover, the plumes of smoke and debris that are created during the laser cutting process are ejected in a manner that results in little or no film contamination of articles 100. Thus, articles 100 are suitable for use in a variety of applications.

In the shown embodiment, system 52 also includes cleaning station 108, which is configured to remove residue adhered to belt surface 68a from the laser cutting process. For example, when cutting the channels in film 54 to produce articles 100, the heat from laser beam 92 may partially melt the material of film 54 at the bottom of the channels. While this prevents the channels from extending entirely through film 54, and continues to direct the plumes of smoke and debris upward, this may leave film 54 mildly tacking to belt surface 68a.

Air knife 106 is suitable for separating film 54 from metal belt 68 despite this mild tackiness. However, when film 54 separates from metal belt 68, small amounts of residue from the cutting process may remain adhered to metal belt 68. This may also occur when film 54 is cut entirely through, such as at locations that do not affect articles 100. Because metal belt 68 rotates and is repeatedly used for successive laser cutting processes, the residue may accumulate over time if left unattended. Such accumulations could potentially disrupt the substantially smooth topography of belt surface 68a, which can reduce the accuracy of the laser cutting process.

Cleaning station 108 is configured to remove at least a portion (or all) of the residue that is adhered to belt surface 68a while metal belt 68 rotates. This prevents residue accumulations from building up on belt surface 68a over time. Cleaning station 108 may include a variety of different removal mechanisms to remove the residue, such as a cloth with or without solvent, one or more scrapers, brushes, or combinations thereof. The removal mechanism(s) either extend adjacent to, or contact belt surface 68a, to physically remove the adhered residue. The removal mechanisms can be stationary or in oscillatory motion transverse to metal belt 68. The removed residue may then be drawn out through vacuum line 110. The use of cleaning station 108 significantly extends the operating life of metal belt 68 before requiring replacement or a more thorough cleaning.

As shown in FIG. 5B, system 52 may also include recovery assembly 113, which includes tension roller 113a and take-up spool 113b, which are suitable for winding up the cut film 54 with articles 100. In this embodiment, system 52 may be referred to as having three tension zones, including a first tension zone between unwind spool 56 and nip roller 66, a second tension zone between nip rollers 66 and 82, and third tension zone between nip roller 66 and take-up spool 113b.

Film 54 may be supplied on spool 56 from a variety of different manufacturers. Thus, the winding accuracy of film 54 on spool 56 may be unreliable, and may change as successive portions of film 54 are unwound from spool 56. If not accounted for, these variations in winding accuracies may result in misalignments of film 54 at inlet nip 64. Such misalignments can allow air bubbles to be caught between bottom surface 54b of film 54 and belt surface 68a of metal belt 68. These air bubbles can reduce cutting accuracies with laser beam 92, such as by defocusing laser beam 92 and disrupting the intimate contact between film 54 and metal belt 68.

Figure 6:
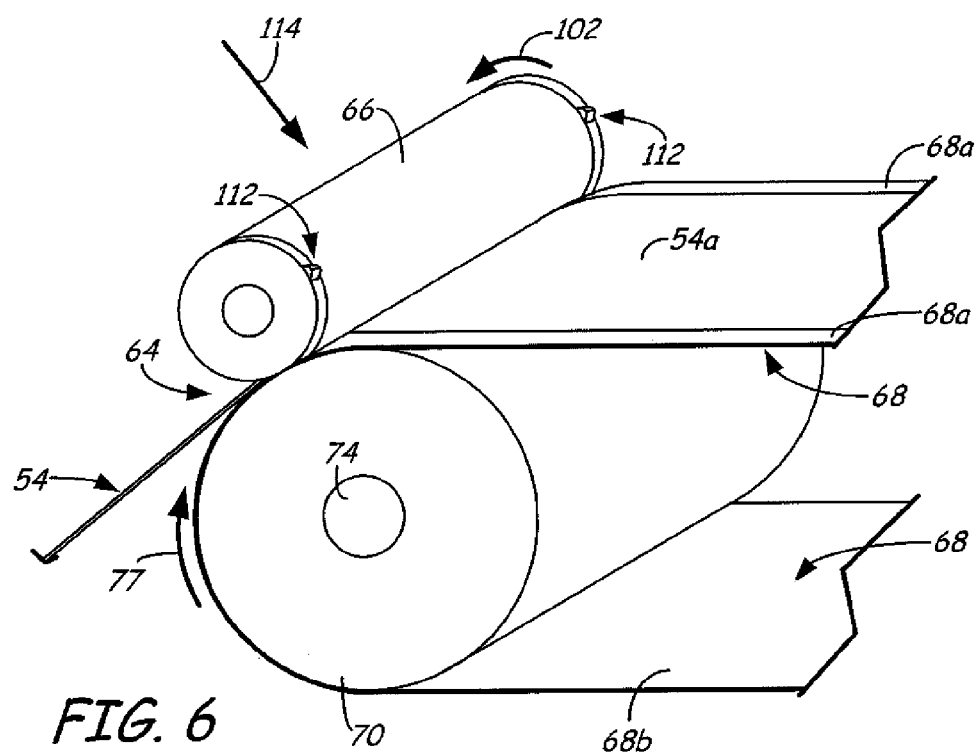
FIG. 6 is an expanded illustration of the web-based, laser processing system, illustrating a nip roller of the system with a cam mechanism.

To reduce or eliminate the entrainment of air bubbles, spool 56 may be equipped with a braking mechanism (not shown) that resists the rotation of spool 56 in the direction of arrow 58. This maintains tension on film 54 between spool 56 and idler roller 60, and between idler roller 60 and inlet nip 64. Additionally, as shown in FIG. 6, nip roller 66 may include cam mechanisms 112, and may be biased toward roller 70, as illustrated by arrow 114. The biasing of nip roller 66 provides a suitable pressure at inlet nip 64 for pressing film 54 against metal belt 68.

In the shown embodiment, cam mechanisms 112 are a pair of protrusions that extend from perimeter surface of nip roller 66. Cam mechanisms 112 are desirably located at the lateral ends of nip roller 66 to prevent cam mechanisms 112 from contacting film 54. Cam mechanisms 112 rotate with nip roller 66 in the direction of arrow 102, and are configured to lift nip roller 66 apart from metal belt 68 and roller 70, against the biasing force in the direction of arrow 114.

Figure 7A:
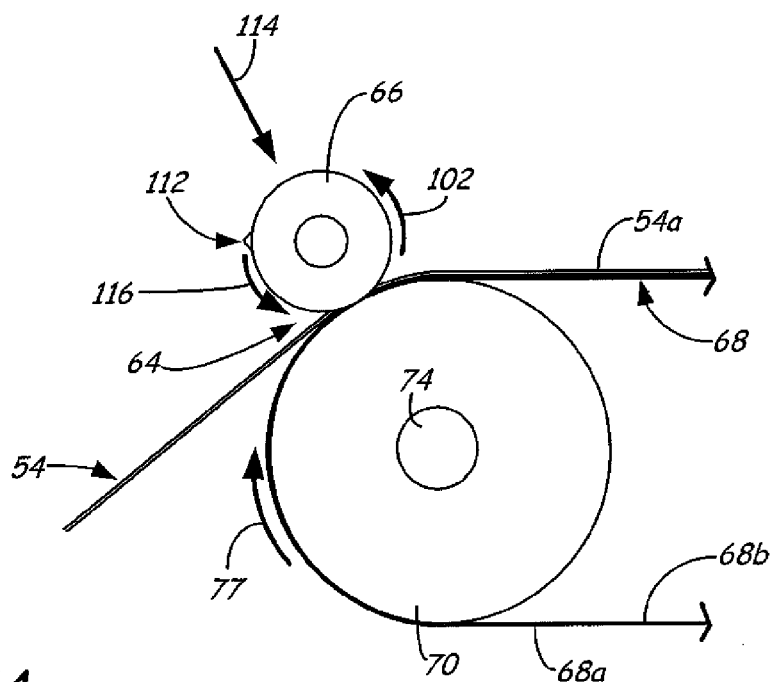
FIGS. 7A-7C are schematic illustrations of the nip roller with the cam mechanism, depicting an operation of the cam mechanism.
Figure 7B:
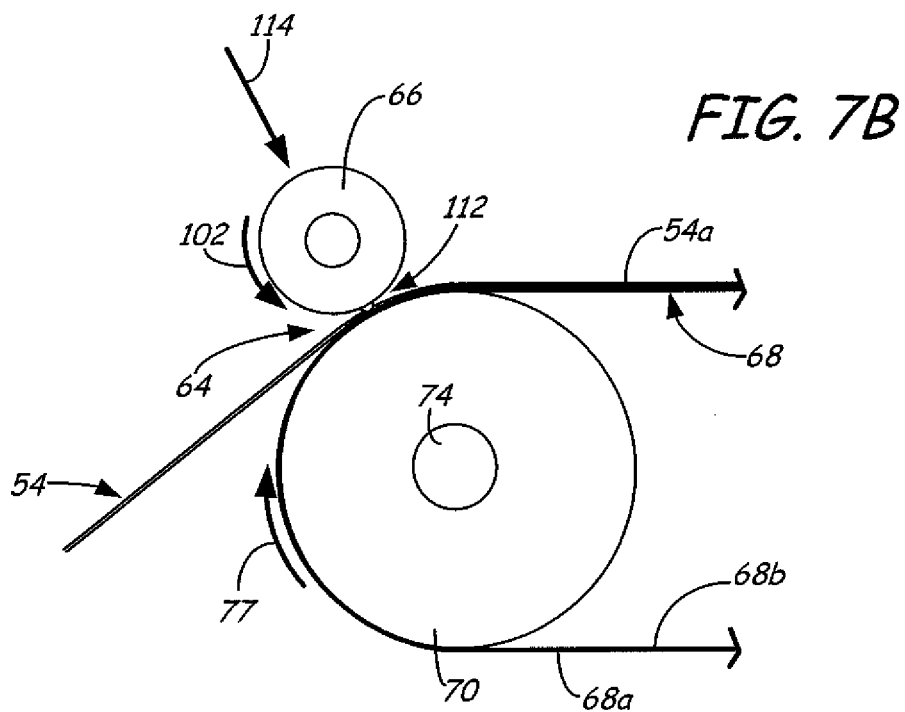
Figure 7C:
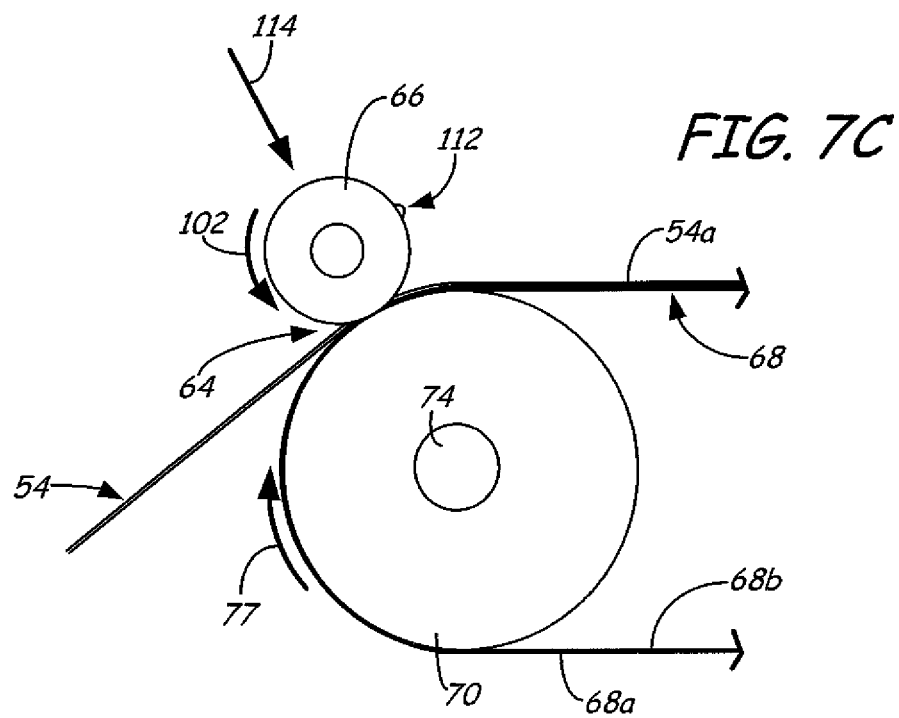

As shown in FIG. 7A, as nip roller 66 rotates in the direction of arrow 102, cam mechanisms 112 approach metal belt 68 and roller 70, as illustrated by arrow 116. As shown in FIG. 7B, upon reaching metal belt 68, cam mechanisms 112 lift nip roller 66 apart from metal belt 68 and roller 70 against the biasing force. This disengages nip roller 66 from film 54 at inlet nip 64, removes the tension applied to film 54 between nip rollers 66 and 82, and allows film 54 to adjust its position to correct for any misalignments. In particular, the tension applied to film 54 from the brake mechanism of spool 56 pulls film 54 into proper alignment. This adjustment accordingly reduces or prevents air bubbles from being entrained between film 54 and metal belt 68. As shown in FIG. 6C, as nip roller 66 continues to rotate in the direction of arrow 102, cam mechanisms 112 disengage from metal belt 68, allowing nip roller 66 to again press against film 54 and metal belt 68 under the biasing force. The re-application of the pressure places the properly-aligned film 54 back into intimate contact with metal belt 68.

In the shown embodiment, cam mechanisms 112 lift nip roller 66 once per revolution of nip roller 66 to correct for misalignments of film 54. In alternative embodiments, may include a single cam mechanism 112, or three or more cam mechanisms 112 positioned at different locations around nip roller 66, as desired. In addition, the nip roller 66 may be moved to relieve tension through a suitable software controlled actuator.

In some embodiments, system 54 may also include one or more mechanisms for actively keeping film 54 laterally centered along metal belt 68, and for keeping metal belt 68 laterally centered along rollers 70 and 72. For example, spool 56 and/or idler roller 60 (shown in FIG. 5A) may function as steering rolls to laterally correct for any lateral misalignments of film 54 prior to entering inlet nip 64.

In addition, one or both of rollers 70 and 72 (shown in FIG. 5A) may include grooves that apply friction to rear surface 68b of metal belt 68 to laterally center metal belt 68 on roller 70 and/or roller 72. This prevents metal belt 68 from winding off of roller 70 during operation. For example, as shown in FIG. 8A, roller 70 may include grooves 115 that extend generally concentric with roller 70. As shown in FIGS. 8B and 8C, grooves 115 may be pitched (e.g., a 0.50-inch pitch) to adjust the aggressiveness of the lateral force applied to metal belt 68. Other mechanisms may also be used to center the belt 68 such as a steering roller. Such steering rollers are commercially available.

In addition to centering metal belt 68, grooves 115 also reduce the contact surface area between rear surface 68b of metal belt 68 and roller 70, thereby reducing the amount of wear of metal belt 68 during use. Furthermore, grooves 115 may assist in cleaning rear surface 68b. While FIGS. 8A-8C illustrate roller 70 with grooves 115, roller 72 may also include a similar groove arrangement.

Figure 9:
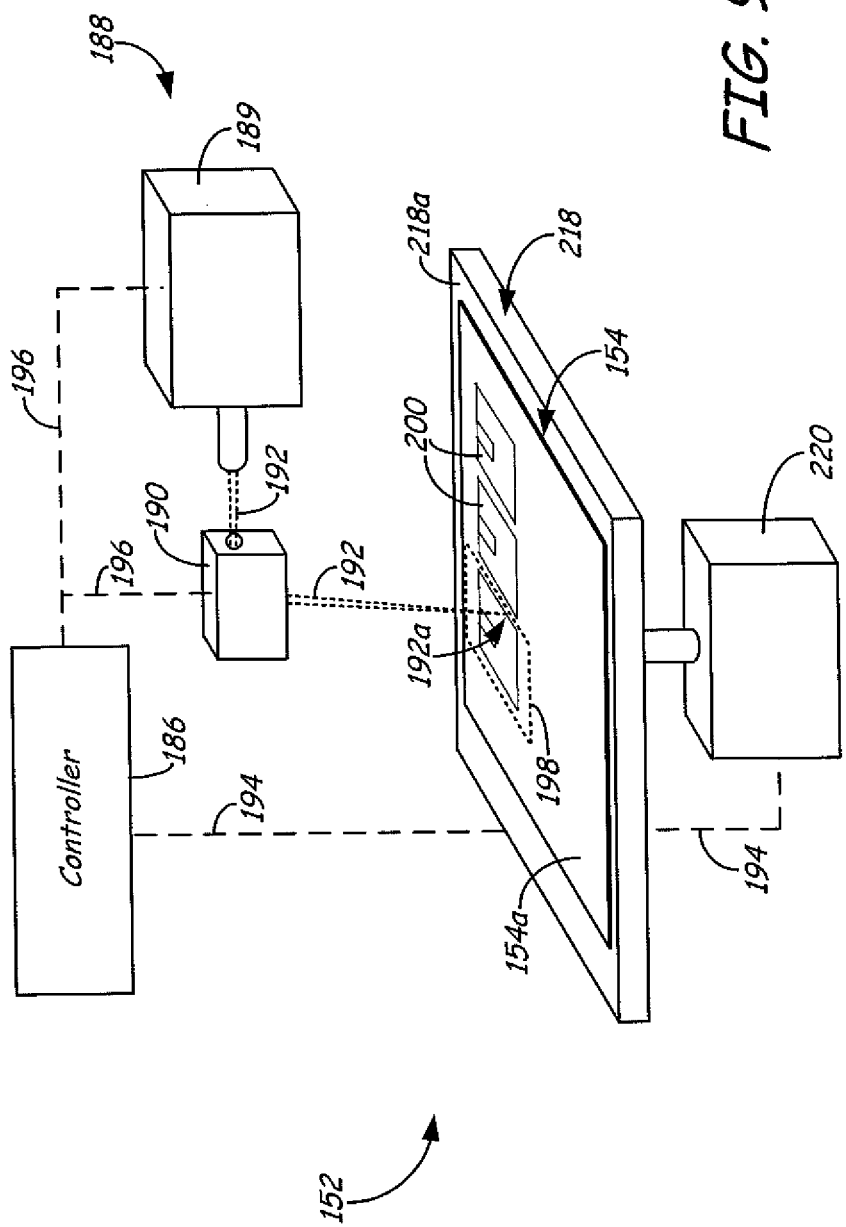
FIG. 9 is a perspective illustration of a platform-based, laser processing system of the present disclosure in use.

In addition to a web-based system, the laser processing system of the present disclosure may also be operated in a sheet-based process. As shown in FIG. 9, laser processing system 152 is an example of a sheet-operating system for cutting a variety of different designs into films, such as film 154, with high-positional accuracies and little or no film contamination. System 152 may operate in a similar manner to system 52 (shown in FIG. 5), where respective reference numbers are increased by "100". In this example, film 154 may be provided in sheet form rather than as a continuous web.

Furthermore, metal platform 218 (having a platform surface 218a) and motion mechanism 220 (either by moving the material as shown in FIG. 9 or by moving galvo scanner 190) are used in lieu of metal belt 68 and rollers 70 and 72. Accordingly controller 186 may direct laser beam 192 to cut into film 154 to produce products 200 in the same manner as discussed above for system 52. However, in addition to moving focal point 192a of laser beam 192 with galvo scanner 190, controller 186 may also move metal platform 218 with motion mechanism 220 in a horizontal plane to adjust the location of workspace area 198.

During operation, film 154 may be manually placed on top surface 218a of metal platform 218, where top surface 218a is substantially planar and has a substantially smooth topography. Film 154 may be restrained against top surface 218a using one or more restraining mechanisms (e.g., clamps, not shown) positioned at the perimeter edges of film 154, and/or with vacuum orifices in metal platform 218 located at the perimeter edges of film 154. Metal platform 218 may function as a shuttle table based on the operation of motion mechanism 220 to load and unload film 154 respectively before and after the laser cutting process.

Motion mechanism 220 is one or assemblies configured to move metal platform 218 substantially along one or more axes in a plane. For example, motion mechanism 220 may include one or more linear bearing shafts and reciprocating bearing sleeves configured to move metal platform 218 substantially along a first axis with the use of a drive belt and motor. Motion mechanism 220 may also include one or more linear bearing shafts and reciprocating bearing sleeves configured to move metal platform 218 substantially along a second axis with the use of a second drive belt and second motor, where the second axis is perpendicular to the first axis to define the plane. In yet another alternative embodiment, motion mechanism 220 may incorporate a robotic arm assembly to provide multiple degrees of movement for metal platform 218.

In an alternative embodiment, motion mechanism 220 may incorporate one or more linear bearing shafts and reciprocating bearing sleeves configured to move the galvo scanner 190 while metal platform 218 (and film 154) remains stationary. Accordingly, system 152 may include different motion mechanisms configured to move galvo scanner 190 and/or metal platform 218 to provide movement relative to each other.

As discussed above for system 52, laser source 188 generates laser beam 192 to cut channels into film 154 in a manner such that the cut channels do not extend through film 154 or barely extend through film 154. As such, the bottom surface of film 154 (not shown) remains in intimate contact with platform surface 168a at the cut channels. This ejects plumes of smoke and debris upward through the cut channels, which reduces or prevents the layers of film 154 from delaminating to reduce or eliminate contamination of the layers of film 154. Additionally, the upward ejection of the plumes prevent film 154 from being lifted upward from platform surface 168a. As such, the relative locations of film 154 and focal point 192a of laser beam 192 are substantially unchanged, thereby preventing laser beam 192 from defocusing.

Furthermore, because the cut channels do not extend entirely through film 154 or barely through film 154, metal platform 218 has a lower exposure to laser beam 192 compared to a mesh backing (e.g., honeycomb support 12, shown in FIGS. 1 and 2). Thus, metal platform 218 may be used for greater durations before requiring replacement.

System 24 (shown in FIGS. 3 and 4), system 52 (shown in FIGS. 5-7C), and system 152 (shown in FIG. 9) illustrate example embodiments of the laser processing system and technique of the present disclosure. As described above, the laser processing system includes a metal substrate (e.g., a belt or platform) having a surface with a substantially smooth topography, and which is configured to receive a film for a laser cutting process. The system also includes a laser source configured to direct a laser beam toward the received film to cut the film in a predetermined pattern, where the cut does not extend entirely through the film. This provides cuts with high-positional accuracies and little or no film contamination, making the system particularly suitable for cutting multi-layered optical films.

Although the present disclosure has been described with reference to preferred embodiments, workers skilled in the art will recognize that changes may be made in form and detail without departing from the spirit and scope of the disclosure.

The invention claimed is:

1. A method for laser processing a film, the method comprising:
    rotating a metal belt having a belt surface with a substantially smooth topography;
    biasing a roller toward the belt surface of the metal belt;
    feeding a film to and pressing the film against the belt surface such that an adjoining surface of the film is in intimate contact with the belt surface;
    moving the biased roller apart from the belt surface based on a rotation of the roller to disengage the roller from the fed film;
    reengaging the biased roller with the fed film to press the fed film against the belt surface;
    generating a laser beam having a focal point that is directed toward the pressed film;

moving the focal point of the laser beam relative to the pressed film to cut into the pressed film based on a predetermined pattern;

directing a plume created by the laser beam upward and away from the belt surface; and discontinuing the laser beam, wherein, after discontinuing the laser beam, the adjoining surface of the pressed film remains uncut.

2. The method of claim 1 wherein the film is fed to a nip between the belt surface and the biased roller.

3. The method of claim 1 wherein the belt surface has holes, openings or apertures that are less than about 760 micrometers.

4. The method of claim 1 wherein the plume is ejected upwardly at an angle relative to an incident angle of the laser beam such that the plume is ejected away from the cut in the film.

5. The method of claim 4 wherein the upward ejection of the plume prevents the film from being lifted upward from the belt surface thereby preventing the laser beam from defocusing.

6. The method of claim 1 wherein the film is a multi-layered film and the film is cut up to a layer adjacent the belt.

7. The method of claim 1 wherein a thickness of the film left uncut is less than or approximately equal to a width of a kerf proximate a bottom of the cut.

8. A method for laser processing a film, the method comprising:

rotating a metal belt having a belt surface with a substantially smooth topography;

feeding a film to and pressing the film against the belt surface such that an adjoining surface of the film remains in intimate contact with the belt surface;

cutting a channel into the pressed film with a laser beam, wherein the adjoining surface of the cut film remains in intimate contact with the belt surface at the cut channel;

removing the cut film from the belt surface, wherein residue of the cut film remains on the belt surface at a location of the cut channel; and removing at least a portion of the residue from the belt surface while rotating the metal belt.

9. The method of claim 8 wherein the film is fed to a nip between the belt surface and a biased roller.

10. The method of claim 8 wherein the belt surface has holes, openings or apertures that are less than about 760 micrometers.

11. The method of claim 8 wherein a plume created by the laser beam is directed upward and away from the belt surface.

12. The method of claim 11 wherein the plume is ejected upwardly at an angle relative to an incident angle of the laser beam such that the plume is ejected away from the cut in the film.

13. The method of claim 12 wherein the upward ejection of the plume prevents the film from being lifted upward from the belt surface thereby preventing the laser beam from defocusing.

14. The method of claim 8 wherein the film is a multi-layered film and the film is cut up to a layer adjacent the belt.

15. The method of claim 8 wherein a thickness of the film left uncut is less than or approximately equal to a width of a kerf proximate a bottom of the cut.

\* \* \* \* \*